(12) United States Patent
McDaniel et al.

(10) Patent No.: US 8,833,177 B2
(45) Date of Patent: Sep. 16, 2014

(54) FLUID FLOW RATE MEASUREMENT METHOD INCLUDING TWO PITOT TUBES, A DIFFERENTIAL PRESSURE SENSOR, AND A MICROCONTROLLER

(75) Inventors: Hunter Yates McDaniel, Rockport, TX (US); Philip Edward Heil, Champaign, IL (US)

(73) Assignee: Hunter McDaniel, Los Alamos, NM (US)

( * ) Notice: Subject to any disclaimer, the term of this patent is extended or adjusted under 35 U.S.C. 154(b) by 482 days.

(21) Appl. No.: 13/135,545

(22) Filed: Jul. 7, 2011

(65) Prior Publication Data

US 2013/0008264 A1    Jan. 10, 2013

(51) Int. Cl.
*G01F 1/46* (2006.01)
*G01F 1/36* (2006.01)
*G01F 1/50* (2006.01)
*G05D 7/06* (2006.01)

(52) U.S. Cl.
CPC  *G01F 1/46* (2013.01); *G01F 1/363* (2013.01); *G01F 1/50* (2013.01); *G05D 7/0635* (2013.01)
USPC ....................................... 73/861.65

(58) Field of Classification Search
None
See application file for complete search history.

(56) References Cited

U.S. PATENT DOCUMENTS

| 4,320,665 | A | * | 3/1982 | Cain | 73/861.04 |
| 4,875,292 | A | * | 10/1989 | Gibson | 33/304 |
| 5,591,399 | A | * | 1/1997 | Goldman et al. | 422/44 |
| 2003/0130815 | A1 | * | 7/2003 | Cohen et al. | 702/140 |
| 2005/0145191 | A1 | * | 7/2005 | Cohen et al. | 119/455 |
| 2010/0011869 | A1 | * | 1/2010 | Klosinski et al. | 73/700 |

* cited by examiner

*Primary Examiner* — Harshad R Patel

(57) ABSTRACT

A method for measuring the flow rate of a fluid using a differential pressure sensor is presented. In this method, two pitot tubes are positioned within in flowing fluid, creating a pressure differential that is converted to a voltage by a differential pressure sensor. The voltage is transmitted to a programmable microcontroller for computation of flow rate based on a calibration procedure that was been used to determine the relationship between voltage and flow rate. The microcontroller may also be used to correct for temperature variations, store fluid flow rates, calculate the total volume of fluid that has passed, transmit data, display data, modify the fluid flow, or automatically run a calibration routine.

2 Claims, 11 Drawing Sheets

FLUID FLOW RATE MEASUREMENT METHOD INCLUDING TWO PITOT TUBES, A DIFFERENTIAL PRESSURE SENSOR, AND A MICROCONTROLLER

CROSS-REFERENCE TO RELATED APPLICATIONS

[Not Applicable]

BACKGROUND OF THE INVENTION

The present invention generally relates to a system and method for measuring pressure differential created by flowing fluids. More particularly, the present invention relates to a system and method for using pressure differential measurements to measure fluid flow rate and to calculate volumes of fluids passing through a pipeline inexpensively and accurately.

Using integrated circuit technology to bring cheap and efficient solutions to problems in developing countries helps assist philanthropic and government organizations around the world that are building schools, clinics, or homes for poor families. For example, using integrated circuit technology and electronics to develop a low cost off-grid solar water heating system has allowed digital monitoring of a number of inputs such as water temperature and controlled switch pumps to optimally move water according to thermodynamics principles. In dry regions of the world, water is a major concern in terms of both efficient usage and the cost of building, monitoring and maintaining a water distribution system. Monitoring water usage remotely and electronically in real time in these regions is important for distribution and billing purposes and eliminates the need for an individual to report readings periodically. The ability to build an accurate, reliable, and inexpensive electronic device with no mechanical moving parts compatible with water delivery and storage systems in developing countries is desirable.

Prior art systems allow a user to measure fluid flow rate and volume using pressure differential created by flowing fluids. For example, in Columns 4-5, Paragraphs 0067-0068, Wang et. al., U.S. Pat. Appl. No. 2009/0221986A1, describe a system for delivering medical fluids to a patient using a flow sensor module which monitors fluid pressure differential across a flow restrictor downstream of a flow valve. As further described in Column 6, Paragraphs 0078-0079, the flow sensor module includes both a flow restrictor and a differential pressure sensor that directly or indirectly measures pressure differential.

As another example, Wiklund et. al., U.S. Pat. No. 6,725,731, describe a system to measure differential pressure created by flowing fluids. As described in Columns 3-4, a flow restriction member is placed inside a pipe and a differential pressure sensor is embedded in said flow restriction member. In the embodiments described in Columns 3-4, a pressure drop is created by the flow restriction member and this pressure drop is sensed by the embedded pressure sensor. Furthermore, a separate temperature sensor is placed in the pipeline as well as a static pressure sensor as described in Column 5. Another embodiment of the system described by in Column 7 and FIG. 14 allows a differential pressure sensor to be proximate to the exterior of a flow sensor by configuring a flow restriction member such that flow is constricted in the pipe by narrowing the walls of the pipeline toward the center of the pipe and placing ports on either side of this constricted portion.

Another example of a technique to measure flow rate of fluids using pressure differential is described by Wiklund et. al., U.S. Pat. No. 5,817,950. As described in Columns 3-4 and FIGS. 1A-1C, an averaging pitot tube having a plurality of openings on a forward-facing and backward-facing surface is used to average pressure measurements taken across the entire flow of fluid or gas in a pipe. To adjust fluid flow calculations for temperature changes in the fluid flowing in a pipe, a separate resistive temperature device is positioned downstream from the averaging pitot tube, as described in Column 3 and FIG. 1A.

Another example of using pressure differential to measure velocity of flowing fluids is described by Amir et. al., U.S. Pat. No. 3,678,754. One embodiment of the device disclosed in Amir et. al. described in Column 1, relies on the use of a plate orifice placed inside a pipe where fluid is flowing to create pressure differences at two separate measuring taps along the pipeline. A separate embodiment, described in Columns 2-3, relies on a concentric or double pitot tube placed in a single location in the pipeline to create pressure measurements that move a piston inside a cylinder. The movements of this piston reflect pressure differential measurements that are recorded either using a pen making a trace on paper, or by visually noting how far the piston moves relative to etchings on the glass column in which a piston moves, as described in as described in Column 2. As described in Column 3, the device is limited to detection of fluid flow rates of 0.36 liters per hour.

The prior art systems for measuring fluid flow rate and volume using pressure differential have several disadvantages. First, the systems of Wang et. al., Wiklund et. al. ('731), and Amir et. al. require that a flow restriction is placed on the fluid that is flowing inside a pipe or tubing to generate a differential pressure. The systems of Wang et. al. and Wiklund et. al. ('950) further require that a separate temperature measurement be taken to allow a user to obtain accurate fluid flow information.

Next, the systems of Wiklund et. al. ('950) require that an averaging pitot tube be placed across the entire flow space of a pipe or tubing and require that a user place the plurality of openings in the averaging pitot tube at specific distances relative to the exterior and center of the pipe carrying a flowing fluid. Because the averaging pitot tubes employed by Wiklund et. al. ('950) cross the entire diameter of the pipe through which fluid flows, they necessarily restrict fluid flow. Furthermore, because these systems utilize averaging pitot tubes with different shapes and sizes, they must be calibrated to the particular shape and size of the averaging pitot tube, must rely on a separate temperature measurements, and must include an estimate of the static pressure to be accurate.

Finally, the device of Amir et. al. requires that mechanical moving parts be employed to allows the measurement of pressure differential. Furthermore, the device of Amir et. al. requires that measurements be recorded with paper or by visualizing movement of a piston relative to glass etchings on the outside of a cylinder.

BRIEF SUMMARY OF THE INVENTION

One or more of the embodiments of the present invention provide systems and methods for measuring pressure differential. The system is comprised of a meter device, low pass filter, a microcontroller, and a control system. The meter device is comprised of fluid piping, a first pitot tube, a first tubing, a second pitot tube, a second tubing, and a pressure sensor. The first and second pitot tubes are connected to the pressure sensor with the first and second tubing. The low pass filter is connected in between the pressure sensor and microcontroller. The meter device is in unidirectional communication with the microcontroller. The microcontroller is in unidirectional communication with the control system.

In operation, the microcontroller is programmed using a control system to fit voltage to a second order polynomial representing fluid flow rate through a pipeline. The first and second pitot tubes are positioned in a fluid piping such that one end is inside the pipe and the other end passes through the exterior wall of the pipe. Fluid flowing across the first pitot tube creates positive pressure in the first pitot tube that is transferred through the first tubing to the pressure sensor. Fluid flowing through across the second pitot tube creates negative pressure that is transferred through the second tubing to the pressure sensor. The positive and negative pressure transferred from the first and second pitot tubes to the pressure sensor result in a pressure differential and create a voltage in the pressure sensor which is transmitted to through the low pass filter and then to the microcontroller. The microcontroller or control system may be used to store fluid flow rate data once data is fit to the polynomial and fluid flow rate is calculated. The control system or microcontroller may be used to monitor fluid flow rate and fluid volume flowing through a pipeline. In other embodiments, the control system or the microcontroller may be configured to open and close a control valve in a pipeline. A user may determine a volume or a time to close a pipeline and prevent fluid from flowing through a pipeline. A user may also program the microcontroller to calculate direction of fluid flow through a pipeline by using the magnitude of voltage output from the pressure sensor and transmitted to the microcontroller.

DETAILED DESCRIPTION OF THE INVENTION

Figure 1:
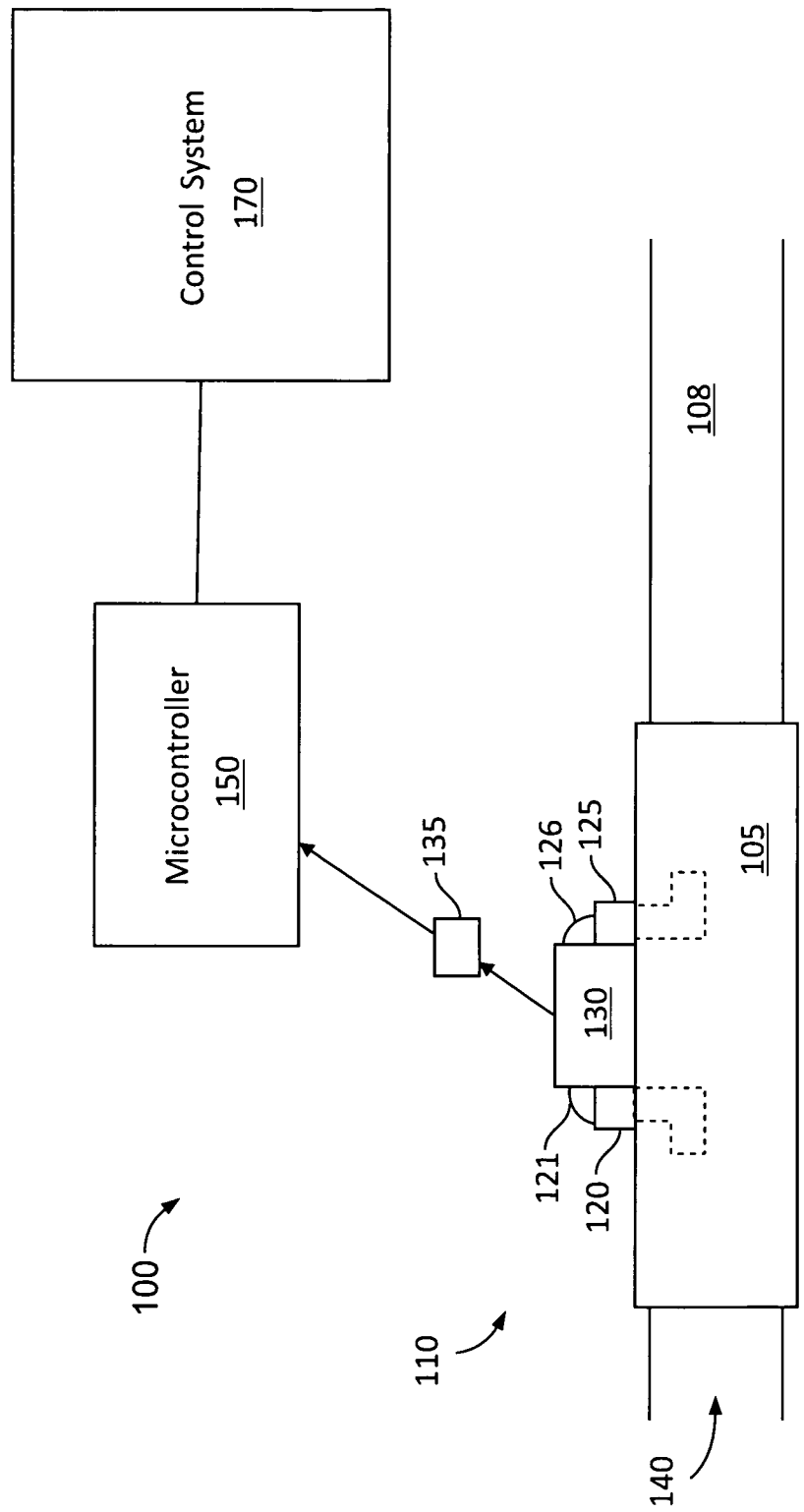
FIG. 1 illustrates a block diagram of a system for measuring pressure differential according to an embodiment of the present invention.

FIG. 1 illustrates a block diagram of a system for measuring pressure differential 100 according to an embodiment of the present invention. The system for measuring pressure differential 100 includes a pipeline 108, a meter device 110, a low pass filter 135, a fluid flow indicator 140, a microcontroller 150, and a control system 170. The meter device 110 further includes a fluid piping 105, a first pitot tube 120, a first tubing 121, a second pitot tube 125, a second tubing 126, and a pressure sensor 130.

In the system for measuring pressure differential 100, the pipeline 108 is connected to the fluid piping 105 of the meter device 110. The first pitot tube 120 passes from the center of fluid piping 105 through the external wall of the fluid piping 105 and is connected to the first tubing 121. The first tubing 121 is connected to the pressure sensor 130 (as illustrated in FIGS. 3A and B) on the external wall of the fluid piping 105. The second pitot tube 125 passes from the center of fluid piping 105 through the external wall of the fluid piping 105 and is connected to the second tubing 126. The second tubing 126 is connected to the pressure sensor 130 (as illustrated in FIGS. 3A and B) on the external wall of the fluid piping 105. The pressure sensor 130 of the meter device 110 is in unidirectional communication with the low pass filter 135 and the low pass filter 135 is in unidirectional communication with the microcontroller 150. The microcontroller 150 is in bidirectional communication with the control system 170. The fluid flow travels in the direction of the fluid flow indicator 140.

In operation, fluid passes through pipeline 108 in the direction of the fluid flow indicator 140. As fluid in the pipeline 108 passes through the fluid piping 105 of the meter device 110, it flows across the section of the first pitot tube 120 located inside fluid piping 105 (as illustrated in FIG. 2) and creates a positive pressure that is transferred from the first pitot tube 120 through the first tubing 121 to the pressure sensor 130. As fluid continues to flow through the fluid piping 105 of the meter device 110, it next flows across the section of the second pitot tube 125 located inside fluid piping 105 (as illustrated in FIG. 2) and creates a negative pressure that is transferred from the second pitot tube 125 through the second tubing 126 to the pressure sensor 130 of the meter device 110. The difference in positive pressure created as water flows past the first pitot tube 120 and the negative pressure created as water flows past the second pitot tube 125 are combined at pressure sensor 130 to create a pressure differential. The pressure differential created at pressure sensor 130 creates a voltage in pressure sensor 130 which is transmitted to the low pass filter 135 and then to the microcontroller 150 in the system for measuring pressure differential 100.

Figure 6:
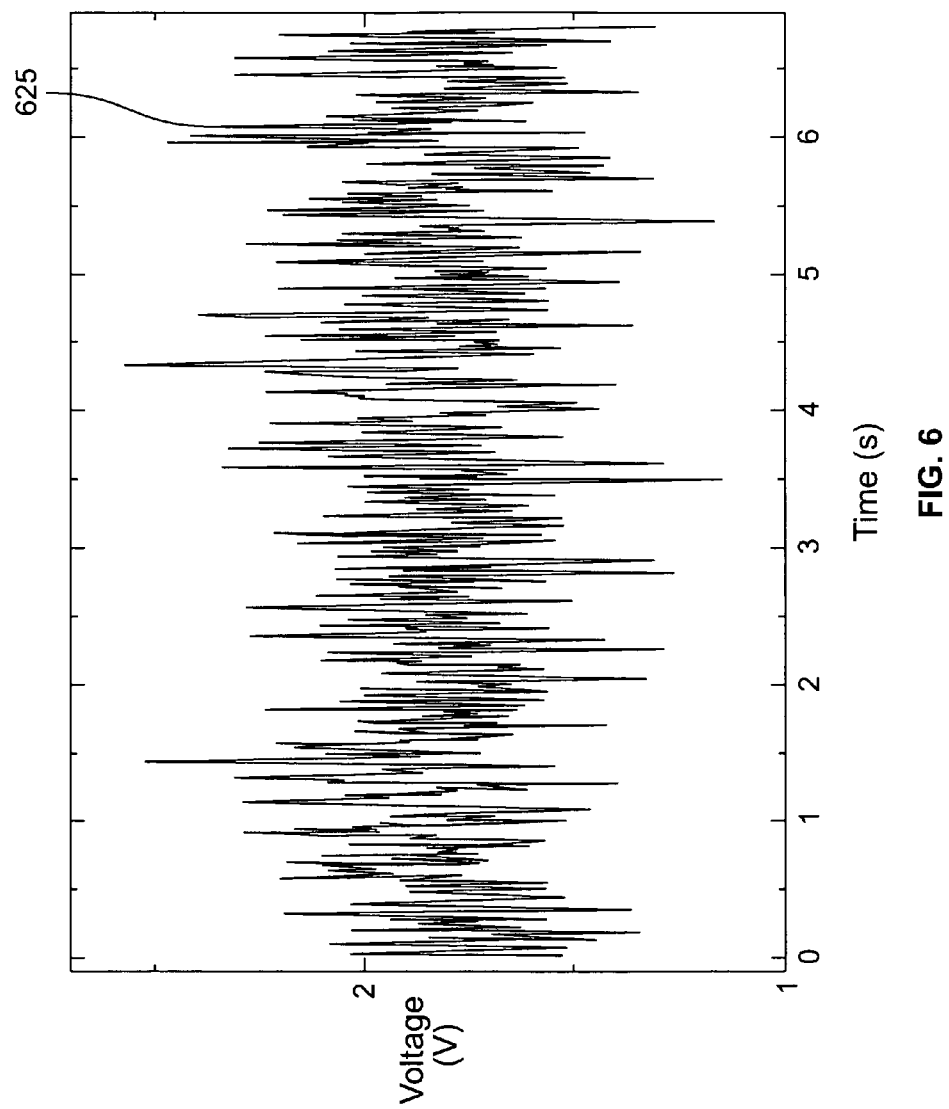
FIG. 6 is a graph of unfiltered voltage over time output by the pressure sensor as fluid is flowing through the meter device of FIG. 1 at a constant rate.
Figure 7:
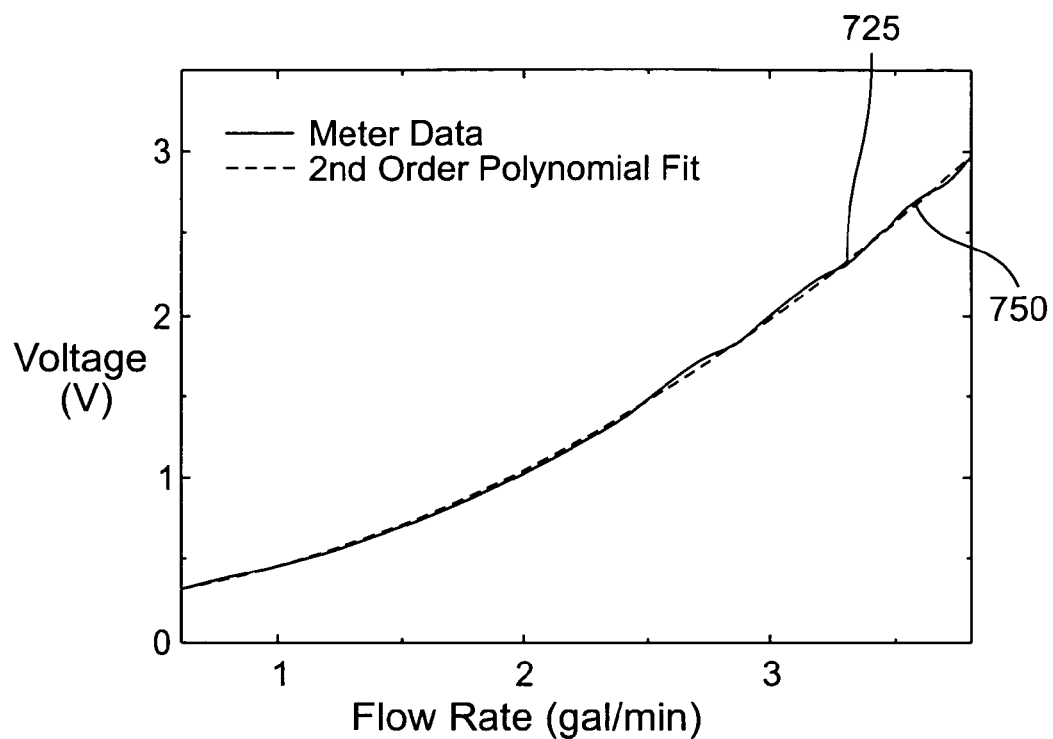
FIG. 7 is a graph illustrating the fit of voltage readings to a second order polynomial enabling the calculation of fluid flow rate through the meter device of FIG. 1.
Figure 8:
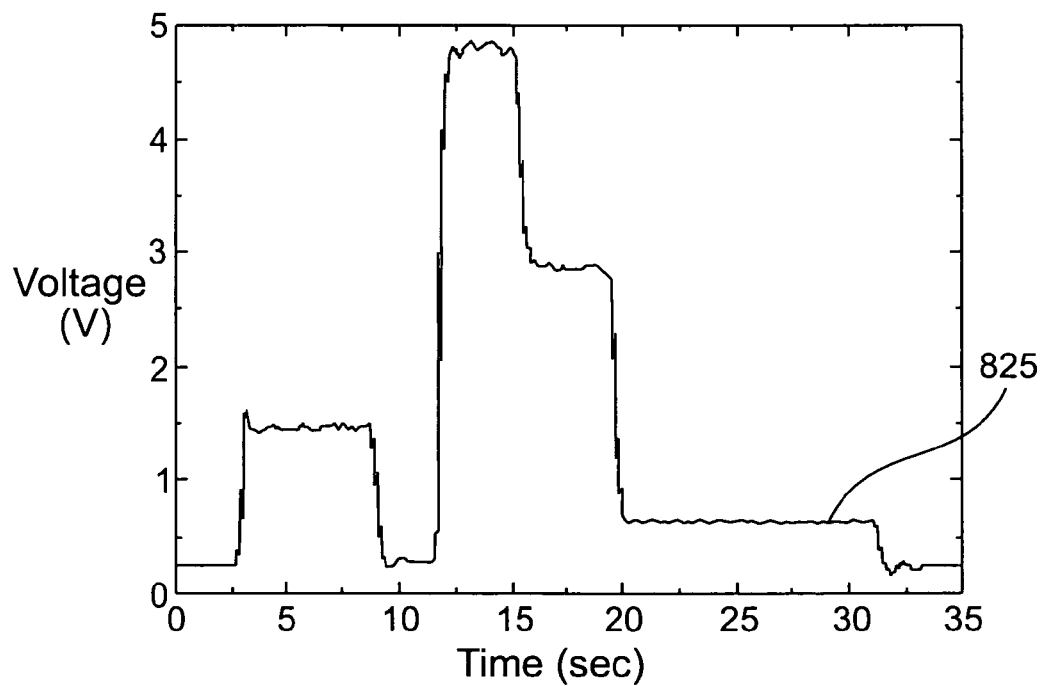
FIG. 8 is a graph illustrating the variation of voltage over time under stepwise adjustment of the fluid flow rate through the meter device of FIG. 1.

The microcontroller 150 is programmed by using the control system 170 to fit voltage transmitted over time (as illustrated in FIG. 6) from pressure sensor 130 to microcontroller 150 to a second order polynomial, where pressure differential (voltage) goes as flow rate squared (as illustrated by FIG. 7). The voltage in pressure sensor 130 of the meter device 110 changes as fluid flow rate changes in the pipeline 108 and the fluid piping 105 of meter device 110 as a result of the changes in pressure differential created by the positive pressure from the first pitot tube 120 and negative pressure from the second pitot tube 125 (as illustrated in FIG. 8). The change in voltage as related to the change in pressure differential allows a user to measure the changes in fluid flow rate (as illustrated in FIG. 8) and to calculate total fluid flow through the pipeline 108 of a system for measuring pressure differential 100 over time.

In another embodiment, the microcontroller 150 may be programmed to calculate the flow direction of a fluid flowing through the meter device 110 and the existing pipeline 108. For example, programming the microcontroller 150 to calculate not only the pressure differential received from the pressure sensor 130, but also to account for the magnitude of the pressure differential the microcontroller 150 may also provide a user with the fluid flow rate and direction in the existing pipeline 108.

In another embodiment, the control system 170 may record the data calculations for flow rate, flow volume and flow direction transmitted from the microcontroller 150. The control system may be in bidirectional communication with a plurality of microcontrollers 150 that may be in unidirectional communication with a plurality of meter devices 110. The control system may be a central location for a user to record, look up, monitor, or otherwise use fluid flow rate and fluid volume data collected from a plurality of meter devices 110.

Figure 2A:
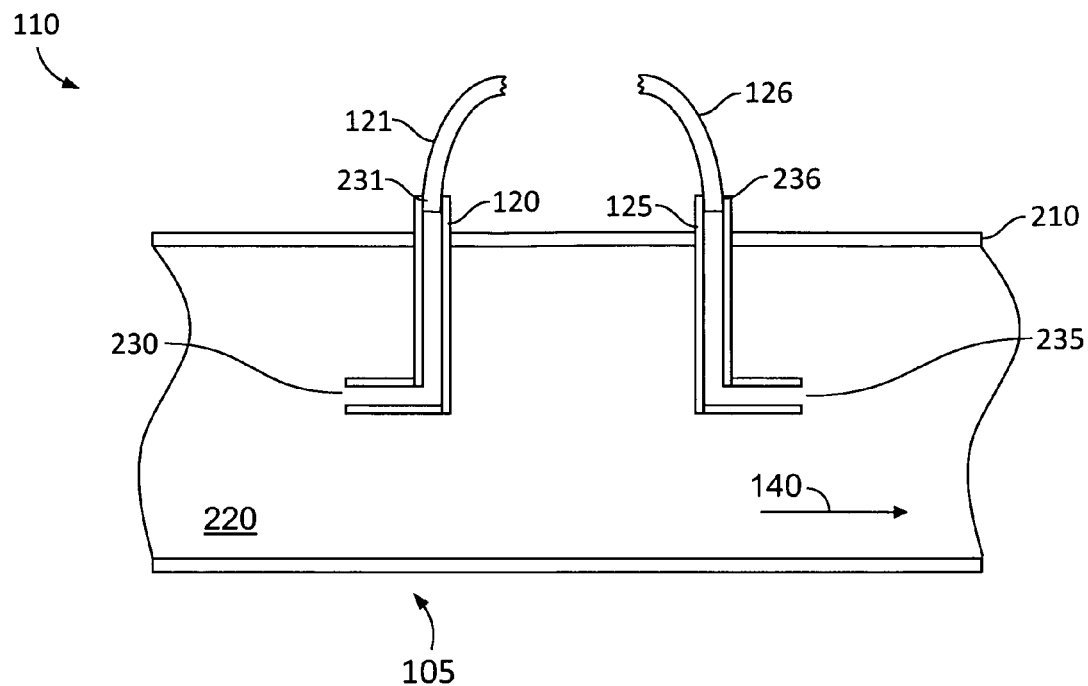
FIG. 2A is a cross sectional view of the meter device of FIG. 1.

FIG. 2A is a cross sectional view of the meter device 110 of FIG. 1. The cross sectional view of the meter device 110 includes the fluid piping 105, the first pitot tube 120, the first tubing 121, the second pitot tube 125, the second tubing 126, and the fluid flow indicator 140. The cross sectional view of the meter device 110 further includes the external wall 210 of fluid piping 105, the internal wall 220 of fluid piping 105, an internal end 230 of the first pitot tube 120, an exterior end 231 of the first pitot tube 120, an internal end 235 of the second pitot tube 125, and an exterior end 236 of the second pitot tube 125.

Figure 2B:
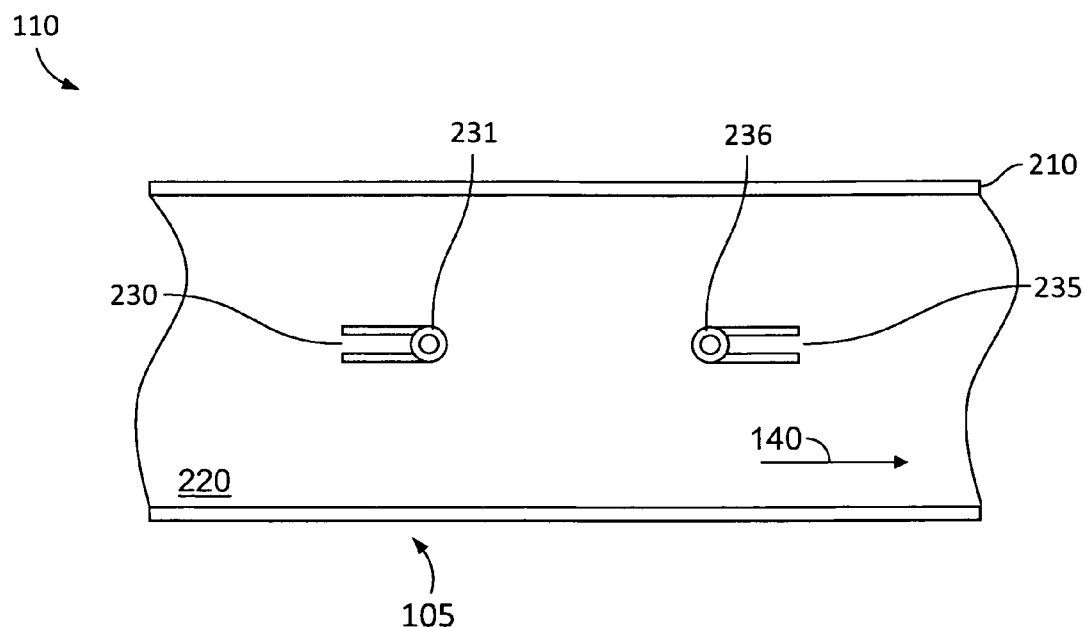
FIG. 2B is a top view of the meter device of FIG. 1.

FIG. 2B is a top view of the meter device 110 of FIG. 1. The top view of the meter device 110 includes the fluid piping 105, the first pitot tube 120, and the second pitot tube 125. The top view of the meter device 110 further includes the external wall 210 of fluid piping 105, the internal wall 220 of fluid piping 105, an internal end 230 of the first pitot tube 120, an exterior end 231 of the first pitot tube 120, an internal end 235 of the second pitot tube 125, and an exterior end 236 of the second pitot tube 125.

Figure 2C:
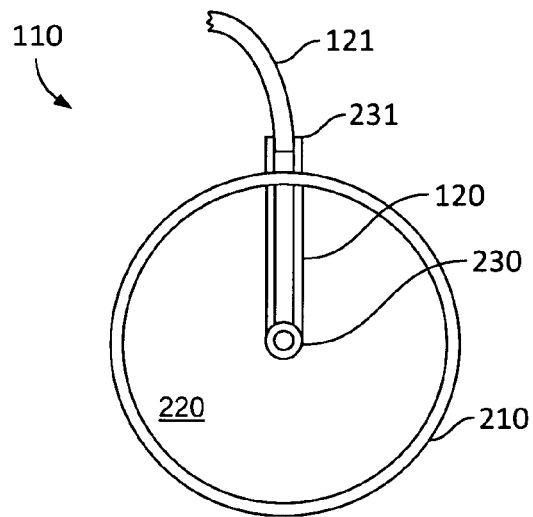
FIG. 2C is an axial view of the meter device of FIG. 1.

FIG. 2C is an axial view of the meter device 110 of FIG. 1 viewed from the upstream end of fluid flow through a pipeline. The cross sectional view of the meter device 110 includes the fluid piping 105, the first pitot tube 120, and the first tubing 121. The axial view of the meter device 110 further includes the external wall 210 of fluid piping 105, the internal wall 220 of fluid piping 105, an internal end 230 of the first pitot tube 120, and an exterior end 231 of the first pitot tube 120.

In the cross sectional view of the meter device 110 (FIG. 2A), the interior end 230 of the first pitot tube 120 has a single opening located inside the interior wall 220 of fluid piping 105. The orientation of the interior end 230 of the first pitot tube 120 is further illustrated in FIG. 2B and FIG. 2C. The first pitot tube 120 passes through the exterior wall 210 of fluid piping 105, where the exterior end 231 of the first pitot tube 120 is connected to the first tubing 121 (FIG. 2A, FIG. 2B, and FIG. 2C). The interior end 235 of the second pitot tube 125 has a single opening located inside the interior wall 220 of fluid piping 105. The orientation of the interior end 235 of the second pitot tube 125 is further illustrated in FIG. 2B. The second pitot tube 125 passes through the exterior wall 210 of fluid piping 105, where the exterior end 236 of the second pitot tube 125 is connected to the second tubing 126 (FIG. 2A and FIG. 2B). The first pitot tube 120 and the second pitot tube 125 are aligned inside fluid piping 105 such that in the axial view (FIG. 2C), the second pitot tube 125 is aligned with and behind the first pitot tube 120 and in the opposite orientation (as illustrated in FIG. 2A and FIG. 2B).

Figure 4:
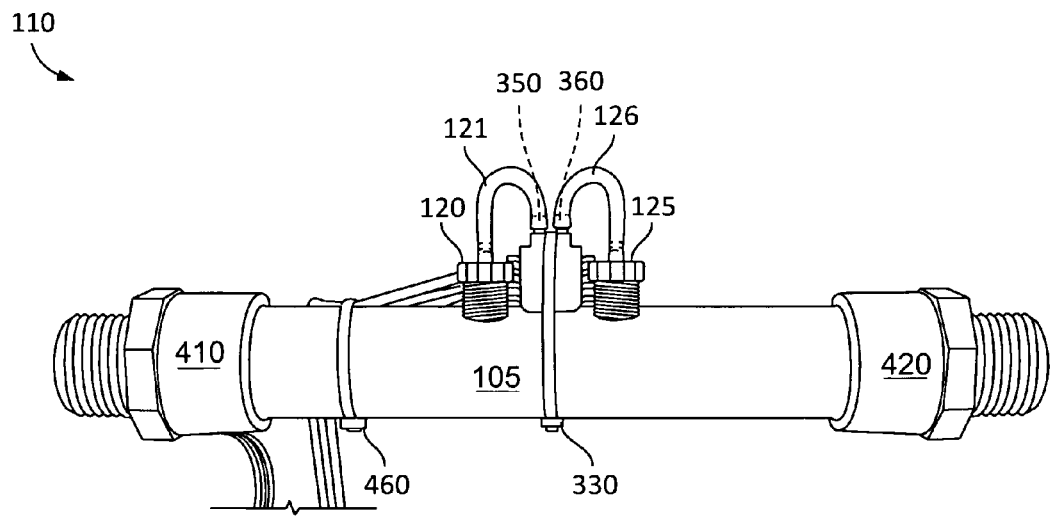
FIG. 4 is an illustration a full anterior view of the meter device of the system for measuring pressure differential of FIG. 1.
Figure 5:
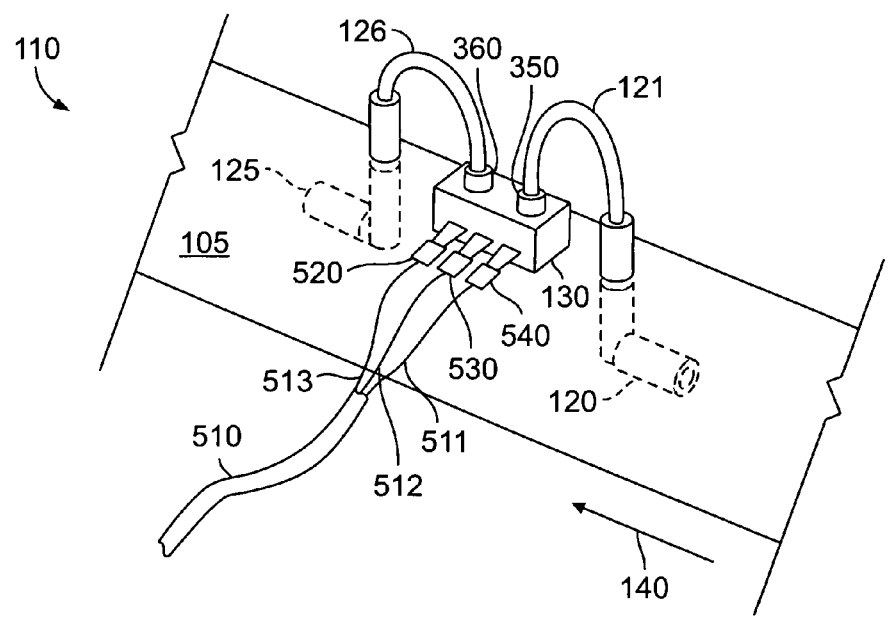
FIG. 5 is an illustration the posterior view of the pressure sensor connection ports to the microcontroller of FIG. 1.

In operation, fluid flows in the direction of the fluid flow indicator 140 inside the fluid piping 105 (FIG. 2A and FIG. 2B). The fluid in the fluid piping 105 first flows across the interior end 230 of the first pitot tube 120 and transfers a positive pressure to the exterior end 231 of the first pitot tube 125, through the first tubing 121 (FIG. 2A and FIG. 2B). The fluid in the fluid piping 105 next flows across the interior end 235 of the second pitot tube 125 and transfers a pressure to the exterior end 236 of the second pitot tube 125, through the second tubing 126 (FIG. 2A and FIG. 2B). The orientation of the first pitot tube 120 and the second pitot tube 125 allows exterior end 231 and exterior end 236 to be connected to the pressure sensor 130 of the meter device 110 on the exterior wall 210 of the fluid piping 105 (as illustrated in FIG. 3, FIG. 4, and FIG. 5).

Figure 3:
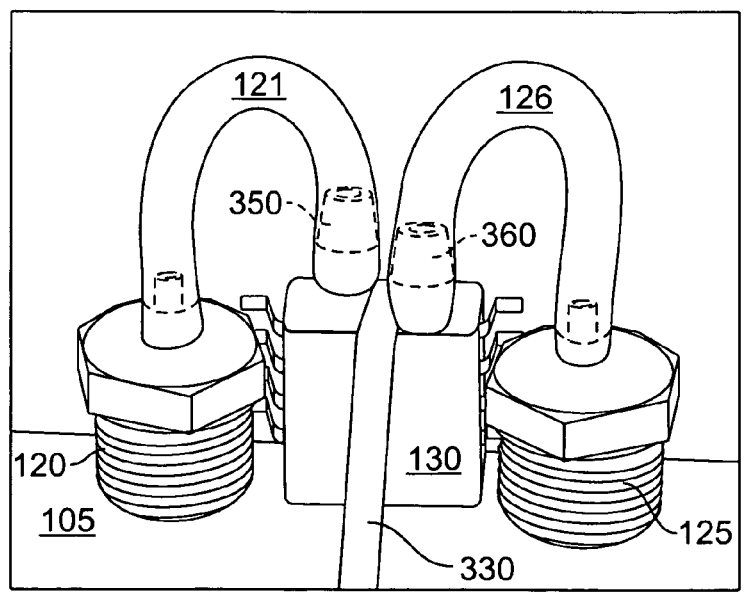
FIG. 3 is an illustration the configuration of the pressure sensor, first pitot tube, and second pitot tube, and the fluid piping of the meter device of FIG. 1.

FIG. 3 is an illustration the configuration of the pressure sensor 130, first pitot tube 120, and second pitot tube 125, on an exterior wall of fluid piping 105 of the meter device 110 of FIG. 1. The view of the meter device 110 in FIG. 3 includes the fluid piping 105, the first pitot tube 120, the first tubing 121, the second pitot tube 125, the second tubing 126, and the pressure sensor 130. The view of the meter device 110 further includes a first fastener 330, a first connection port 350 of the pressure sensor 130, and a second connection port 360 of the pressure sensor 130.

In the illustration shown in FIG. 3, the portion of the first pitot tube 120 passing through the exterior wall of fluid piping 105 is connected to the first tubing 121 and the first tubing 121 is connected to the first connection port 350 of the pressure sensor 130. The portion of the second pitot tube 125 passing through the exterior wall of fluid piping 105 is connected to the second tubing 126 and the second tubing 126 is connected to the second connection port 360 of the pressure sensor 130. The first fastener 330 encircles the pressure sensor 130 and the exterior wall of fluid piping 105 of the meter device 110.

In operation, fluid flowing through the fluid piping 105 creates a positive pressure in the first pitot tube 120 and a negative pressure in the second pitot tube 125 as described above (FIG. 1 and FIG. 2). The seal between the first pitot tube 120 and the first tubing 121 that allows positive pressure created when fluid flows across the first pitot tube 120 to be transferred to the first connection port 350 of pressure sensor 130. Similarly, the seal between the second pitot tube 125 and the second tubing 126 that allows negative pressure created when fluid flows across the second pitot tube 125 to be transferred to the second connection port 360 of pressure sensor 130. The first fastener 330 secures the pressure sensor 130 in place between the ends of the first pitot tube 120 and the second pitot tube 125 on the exterior wall of the fluid piping 105 of the meter device 110 of FIG. 1.

FIG. 4 is an illustration a full anterior view of the meter device 110 of the system for measuring pressure differential 100 of FIG. 1. The anterior view of the meter device 110 includes the fluid piping 105, the first pitot tube 120, the first tubing 121, the second pitot tube 125, the second tubing 126, the pressure sensor 130, and the first connection port 350 and the second connection port 360 of the pressure sensor 130.

The anterior view of the meter device 110 further includes a first treaded cap 410, a second threaded cap 420, and a second fastener 460.

The first threaded cap 410 is connected to an end of the fluid piping 150 of the meter device 110 and the second threaded cap 420 is connected to the opposite end of the fluid piping 105 of the meter device 110. The fastener 460 encircles the exterior wall of fluid piping 105 of the meter device 110.

In operation, the first threaded cap 410 and the second threaded cap 420 allows the fluid piping 105 to be placed in line with the existing pipeline 108 of FIG. 1. The first threaded cap 410 and the second threaded cap 420 allows a seal to be formed between the fluid piping 105 of the meter device 110 and the existing pipeline 108 of the system for measuring pressure differential 100 of FIG. 1. The second fastener 460 encircling the fluid piping 105 secures wires that may be used to connect the pressure sensor 130 to the microcontroller 150.

FIG. 5 is an illustration the posterior view of the meter device 110 in the system for measuring pressure differential 100 of FIG. 1. The posterior view of the meter device 110 includes the fluid piping 105, the first pitot tube 120, the first tubing 121, the second pitot tube 125, the second tubing 126, the pressure sensor 130, the first connection port 350 and the second connection port 360 of the pressure sensor 130. The posterior view of the pressure sensor 130 of the meter device 110 further a wiring conduit 510, a first wire 511, a second wire 512, a third wire 513, and a first external contact 520, a second external contact 530, and a third external contact 540 of the pressure sensor 130.

The first wire 511, the second wire 512 and the third wire 513 pass through the wiring conduit 510 and are individually soldered to the first external contact 520, the second external contact 530, and the third external contact 540 of the pressure sensor 130 as illustrated in FIG. 5.

In operation, the first wire 511 provides power to the pressure sensor 130, the second wire 512 provides a ground, and the third wire 513 transmits voltage readings from the pressure sensor 130 of the meter device 110 to the microcontroller 150 in the system for measuring pressure differential 100 (FIG. 1). As fluid flows through fluid piping 105 in the direction of the fluid flow indicator 140, positive pressure is created as fluid flows past the first pitot tube 120 and negative pressure is created as water flows past the second pitot tube 125. The positive and negative pressure are transferred through the first tubing 121 and the second tubing 126 to the pressure sensor 130 which causes a voltage to be produced in the pressure sensor 130. This voltage is communicated through the third wire 513 to the microcontroller 150 (FIG. 1) in the system for measuring pressure differential 100.

In the preferred embodiment, the fluid piping 105 of the meter device 110 may be ¾ inches in diameter and 6 inches in length and may be polyvinyl chloride (PVC) material or any other material suitable for carrying fluids. In the preferred embodiment, the first threaded cap 410 and the second threaded cap 420 may be pre-made polyvinyl chloride threaded caps and may have ¾ inch diameter. In alternative embodiments, fluid piping 105, the first threaded cap 410 and the second threaded cap 420 may be any other diameter suitable for connection to an existing pipeline 108.

In the preferred embodiment, the first pitot tube 120 and the second pitot tube 125 of the meter device 110 may be elbow tube fittings with classic series barbs, may have a 3/16 inch (4.8 mm) inner diameter and may be made of polyvinylidene fluoride. The first pitot tube 120 and the second pitot tube 125 may be threaded such that they form a seal between the wall of the fluid piping 105. In the preferred embodiment, the first pitot tube 120 and the second pitot tube 125 are positioned inside the fluid piping 105 such that the portions of the first pitot tube 120 and the second pitot tube 125 that pass through the exterior wall of the fluid piping 105 at an angle that is perpendicular to the exterior wall of fluid piping 105. In the preferred embodiment, the open end of the first pitot tube 120 that is inside the fluid piping 105 faces in the opposite direction to the open end of the second pitot tube 125 that is inside the fluid piping 105. In the preferred embodiment, the ends of the first pitot tube 120 and the second pitot tube 125 that are on the interior wall of the fluid piping 105 (in contact with fluid passing through the meter device 110) are radially centered inside the fluid piping 105. Furthermore, by radially centering the ends of the first pitot tube 120 and second pitot tube 125 inside the fluid piping 105 where the flow rate inside fluid piping 105 or the existing pipeline 108 are maximal, this maximizes the pressure differential sensed by pressure sensor 130 and transmitted to the microcontroller 170.

In an alternative embodiment, the first pitot tube 120 and the second pitot tube 125 may be positioned toward the top or bottom of the inner wall of the fluid piping 105. In other embodiments, the first pitot tube 120 and the second pitot tube 125 may be located in different portions of the fluid piping 105 and may have ends that do not directly oppose one another. In other embodiments, the first pitot tube 120 and the second pitot tube 125 may have orthogonal portions that are equal in length whereas in other embodiments, these lengths may differ based on the size of the meter device 110 constructed.

In another embodiment, the first pitot tube 120 and the second pitot tube 125 may be installed directly into an existing pipeline 108 rather than a separate fluid piping 105. In this embodiment, the pressure sensor 130 may be connected to the first tubing 121 and the second tubing 126 as described above, for example in FIG. 1. The first tubing 121 and the second tubing 126 may be connected to the first pitot tube 120 and the second pitot tube 125 and pressure differential measurements may be taken as described above in FIG. 1, FIG. 2A, FIG. 2B, FIG. 2C, FIG. 3, FIG. 4, or FIG. 5.

In the preferred embodiment, the first pitot tube 120 and the first tubing 121 may be coupled together using a threaded adapter that fits around the first pitot tube 120 and forms a seal with the exterior wall of the fluid piping 105 and with the first tubing 121. Similarly, the second pitot tube 125 may be coupled to the second tubing 126 using a threaded adapter that fits around the second pitot tube 125 and forms a seal with the exterior wall of the fluid piping 105 and with the second tubing 126. For example, the threaded adapter may be ⅛-27 national pipe thread and may have a 7/16 inch hex to 200 series barb, may have a 1/16 inch (1.6 mm) inner diameter, and may be made of polyvinylidene fluoride.

In the preferred embodiment, the first tubing 121 and the second tubing 126 of the meter device 110 may be Tygon tubing with a diameter suitable for connecting to the first pitot tube 120 and the second pitot tube 125. In an alternative embodiment, the first tubing 121 and the second tubing 126 may be any silicone or plastic tubing of suitable size and length.

In the preferred embodiment, the first tubing 121 may be connected to a threaded adapter that fits over the first pitot tube 120 using ear clamps, for example, OETIKER 4.1 mm clamps at each connection point. Similarly, an ear clamp may be used to connect a threaded adapter that fits over the second pitot tube 125 to the second tubing 126. In an alternative embodiment, epoxy, paste, bonding, or other sealant may be used to connect the first tubing 121 and the second tubing 126 to the first pitot tube 120 and the second pitot tube 125, respectively (or an adapter if used), as well as the first connection port 350 and the second connection port 360 of the pressure sensor 130.

In the preferred embodiment, the first fastener 330 and second fastener 460 of the meter device 110 may be zip ties, tape, wire, or other types of fasteners. In an alternative embodiment, first fastener 330 and second fastener 460 may be glue, epoxy, paste, or other types of adhesives or bonding agents.

In the preferred embodiment, where the first pitot tube 120 and second pitot tube 125 pass through the exterior wall of fluid piping 105, a seal may be created by wrapping Teflon tape around the threads of first pitot tube 120 and the second pitot tube 125. In alternative embodiments, glue, paste, epoxy, or any other types of sealants may be used to create a seal and prevent leaking in the fluid piping 105 where the first pitot tube 120 and the second pitot tube 125 are positioned.

In the preferred embodiment, the low pass filter 135 of the meter device 110 may be a 1 kohm resistor in series and a 1 µF capacitor in parallel with the output from the pressure sensor 130. In alternative embodiments, the low pass filter 135 may be any other suitable device that may be connected to the pressure sensor 130 of the meter device 110 and the microcontroller 150.

In the preferred embodiment, the pressure sensor 130 may be a piezoresistive transducer, may have monolithic silicon pressure sensors designed for a wide range of applications, and may be temperature compensated or calibrated to operate in temperatures between −40 to +125 degrees Celsius. An example of a piezoresistive transducer may be a Freescale Semiconductor series MPX5010, MPXV5010, or MPVZ5010 transducer. In the preferred embodiment, the pressure sensor 130 may, for example, offer 0 to 10 kPa or 0.2 to 4.7 V output. In alternative embodiments, the sensitivity and voltage output of the pressure sensor 130 may be changed depending upon the size of the existing pipeline 108 with which the meter device 110 is being used.

In other embodiments the pressure sensor 130 may include a memory chip that may be in bidirectional communication with the microcontroller 150. In this embodiment, the voltage data from the pressure sensor 130 may be transmitted to the microcontroller 150 to calculate a fluid flow rate. The microprocessor 150 may transmit fluid flow rate to the memory chip in the pressure sensor 130 where it may be stored.

In the preferred embodiment, the pressure sensor 130 may have microcontroller 150 or microcontroller A/D inputs. In alternative embodiments, a wide range of pressure sensors 130 that produce an accurate, high level analog output signal that is proportional to the applied pressure may be used. In alternative embodiments, a pressure sensor 130 with axial ports modified to accommodate industrial grade tubing may be used. In alternative embodiments, the pressure sensor 130 may be an integrated silicon pressure sensor and may be on-chip signal conditioned, and may be temperature compensated and calibrated.

In the preferred embodiment, the microcontroller 150 may be an open-source single-board microcontroller. Examples of open source single-board microcontroller may be an Arduino, Parallax Basic Stamp, Netmedia BX-24, Phidgets, Handyboard, and others with similar functionality. Other inexpensive microcontrollers or those that operate using cross platform software which may be, for example, Windows, Macintosh OSX, and Linux operating systems, may be used. The microcontroller 150 may use a simple, clear programming environment or it may use open-source and extensible software. The language of the microcontroller 150 may be programmed using for example, language similar to C, C++ libraries, or the AVR C programming language. The microcontroller 150 may use open-source and extensible hardware which may be, for example, Atmel ATMEGA8 or ATMEGA168.

In the preferred embodiment, the microcontroller 150 may be in connection with the low pass filter 135 using a wired connection, or if a low pass filter 135 is not used, the microcontroller 150 may be in connection with the pressure sensor 130 using a wired connection. The microcontroller 150 may stand alone and may store data and process instructions or the microcontroller 150 may communicate with software running on a computer using for example, Flash, Processing, or MaxMSP.

In the preferred embodiment, microcontroller 150 may be connected to the control system 170 using either a wireless or wired connection. For example, the microcontroller 150 may transmit data to the control system 170 using wireless communication. Examples of wireless communication may include Bluetooth, ZigBee, WiFi wireless connection or the microcontroller 150 may be wired directly to the control system 170 or may be connected using a USB port.

In the preferred embodiment, the control system 170 may be a laptop computer or other portable computing device. For example, the control system 170 may be an iPad, notebook, notepad, or other portable computing device. The control system 170 may also be a stationary computer or computing system. The control system 170 may have a display screen on which a user could view fluid flow rate or fluid volume or both in real time. The control system 170 may further be used to display graphically the data received from the microcontroller 150 in real time so that a user may instantly view his or her fluid use over time or during a predetermined time period.

In an alternative embodiment, the control system 170 may be a mobile hand held device that is able to use an application that communicates wirelessly with the microcontroller 150. Examples of mobile handheld devices may include the iPhone, Android phone, Blackberry, or other smart phones.

In another alternative embodiment, the control system 170 may communicate with a plurality of microcontrollers 150, one or more of which may be connected to an individual meter device 110 or several meter devices 110, for example in the same household or in a plurality of households.

In another alternative embodiment, the microcontroller may be programmed using a control device 170 and then may be connected using a wired or wireless connection to a screen capable of displaying data collected by the meter device 110 to a user.

FIG. 6 is a graph of unfiltered voltage over time as output by the pressure sensor 130 of the meter device 110 in the system for measuring pressure differential 100 of FIG. 1 as fluid is flowing through the meter device 110. The graph illustrates a plot of voltage measurements 625 over time without signal filtering. As discussed above in FIG. 1, the difference in positive pressure created as water flows past the first pitot tube 120 and the negative pressure created as water flows past the second pitot tube 125 are combined at pressure sensor 130 to create a pressure differential (FIG. 1). As discussed above in FIG. 5, the pressure differential created at pressure sensor 130 creates a voltage in pressure sensor 130 which is transmitted through the first wire 510, the second wire 520, and the third wire 530 to the microcontroller 150 in the system for measuring pressure differential 100 (FIG. 1).

In operation of the preferred embodiment, a low pass filter, which may be a 1 kohm resistor in series and a 1 µF capacitor in parallel with the output from the pressure sensor 130, is used to reduce variation in the voltage transmitted from the pressure sensor 130 to the microcontroller 150. As shown in FIG. 6, when a low pass filter is not used, variation is generated in the voltage measurements 625 even when sampled frequently over time. In other embodiments, the frequency of voltage sampling by the microcontroller 150 can be varied such that measurements are taken more frequently or less frequently. For example, the microcontroller 150 may be programmed to take 85 measurements of voltage every second as shown in FIG. 6. Therefore, in absence of using a low pass filter, changing sampling frequency improves the accuracy of the meter device 110, as more data points are fit to a second order polynomial. For example, by using the sampling frequency depicted in FIG. 6 whereby approximately 600 data points are collected for each flow rate and used to fit a polynomial curve, the error in calculation of fluid flow rate can be reduced to less than 0.5%.

FIG. 7 is a graph illustrating the fit of voltage readings (representing pressure differential) to a second order polynomial enabling the calculation of fluid flow rate through the meter device 110 of the system for measuring pressure differential 100 of FIG. 1. The graph illustrates raw voltage data 750 and a polynomial curve fit to the raw voltage data 725. These data are obtained during a calibration process (described below in FIG. 13) whereby the meter device 110 is connected to existing pipeline 108 of the system for measuring pressure differential 100 and a standard meter is placed in line with the meter device 110 in the same existing pipeline 108 configured as described below in FIG. 13. The general equation used to fit the data and calculate flow rate after the calibration process (FIG. 13), where voltage (pressure differential) generally varies with the square of the flow rate is: voltage (pressure differential)=$ax^2+bx+c$, where a, b, and c are constants and x is the flow rate.

As shown in FIG. 7, a second order polynomial curve 725 is fit to the raw voltage data 750, collected from the pressure sensor 130 representing pressure differential created when fluid flows across the first pitot tube 120 and the second pitot tube 125 (FIG. 1), to calculate flow rate of fluid passing through the meter device 110. Once raw data are fit to a polynomial in the calibration process as described below in FIG. 13, the relationship between voltage and fluid flow rate are simplified and the variation in the raw data is reduced so that the polynomial fit for an individual meter device 110 may be stored on the microcontroller 150 or the control system 170 as the reference relationship for conversion of voltage to flow rate when the meter device 110 is in use.

By calculating the flow rate, the total volume of fluid passing through the meter device 110 can also be calculated over time. As discussed above, the microcontroller 150 of the system for measuring pressure differential 100 of FIG. 1 stores flow rate over time and returns total volume in the preferred embodiment.

FIG. 8 is a graph illustrating the variation of voltage (representing pressure differential) over time under stepwise adjustment of the fluid flow rate through the meter device 110 in the system for measuring pressure differential 100 of FIG. 1. The graph illustrates a plot of voltage measurements 825 taken over time as fluid flow rate is varied in a pipeline. As shown in FIG. 8, the pressure differential created as fluid flows through the meter device 110 is represented by voltage sensed by the pressure sensor 130. When no fluid is flowing through the meter device 110 the voltage is zero. As the rate of fluid flowing through the meter device 110 changes, the voltage responds quickly, allowing accurate calculation of flow rate and volume as desired (as illustrated by voltage measurements 825). As discussed above, the in the preferred embodiment, a low pass filter, which may be a 1 kohm resistor in series and a 1 µF capacitor in parallel with the output from the pressure sensor 130 is used to generate smoothed voltage data as are presented in FIG. 8.

Figure 9:
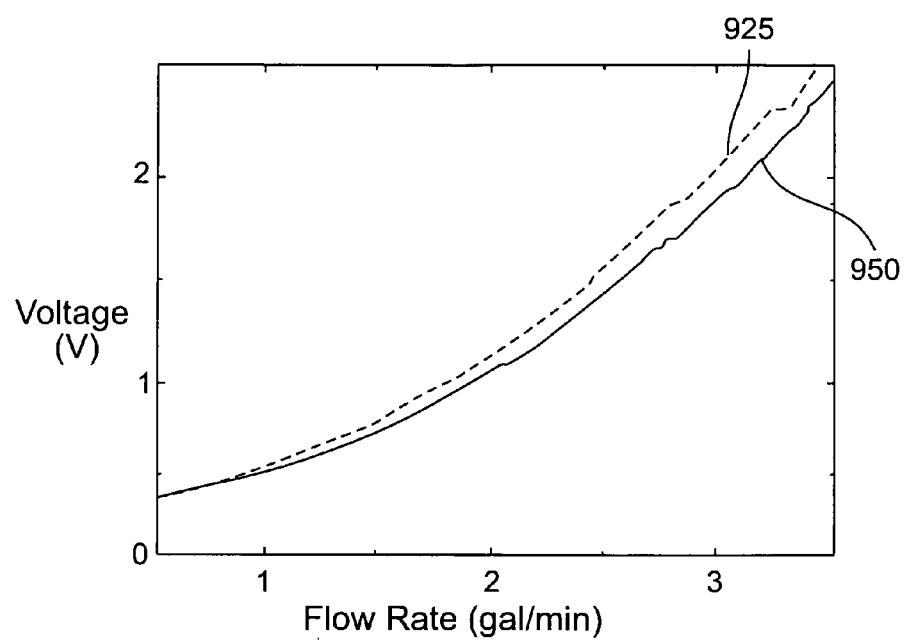
FIG. 9 is a graph illustrating the comparison of voltage readings (representing pressure differential) measured by a pressure sensor as related to fluid flow rate in two separate meter devices 110 of FIG. 1.

FIG. 9 is a graph illustrating the comparison of voltage readings (representing pressure differential) measured by the pressure sensor 130 as it relates to fluid flow rate in two separate meter devices 110 of FIG. 1. The graph illustrates voltage measurements taken from a first meter device 925 as compared with voltage measurements taken from a second meter device 950. As shown in FIG. 9, each individual meter device 110 produces a curve (voltage measurements 925 and 950); however, as is shown in FIG. 9, the voltage measurements 925 and 950 do not overlap. Therefore, variation due to construction of each meter device 110, indicates the importance of the calibration of individual meter devices 110 (as illustrated above in FIG. 8 and as described below in FIG. 13) before they are used to measure fluid flow rate in an existing pipeline 108.

Figure 10:
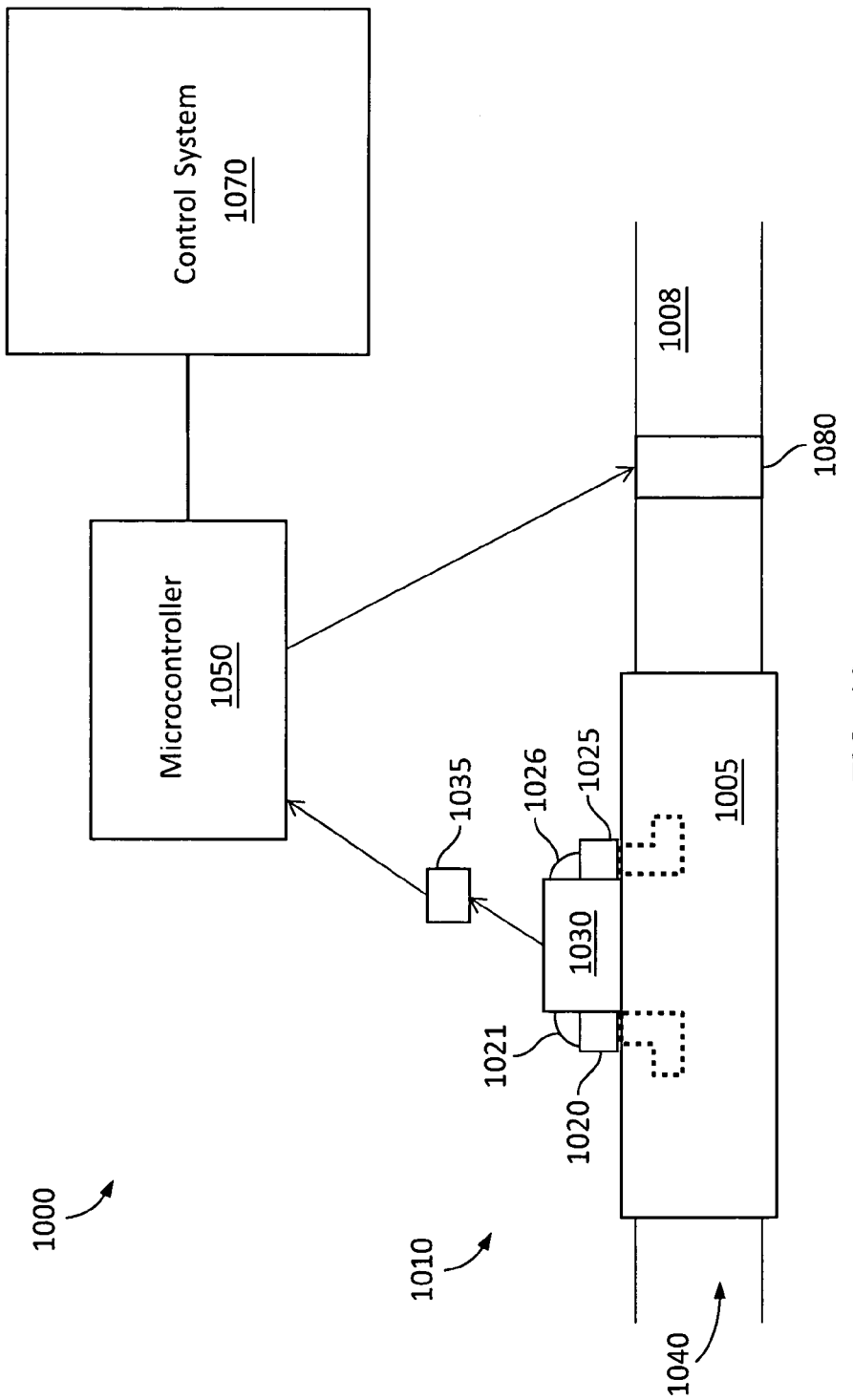
FIG. 10 illustrates a block diagram of an alternative system for measuring pressure differential created by a flowing fluid further including a control valve according to an embodiment of the present invention.

FIG. 10 illustrates a block diagram of an alternative embodiment of a system for measuring pressure differential 1000. The alternative system for measuring pressure differential 1000 includes a pipeline 1008, a meter device 1010, a low pass filter 1035, a microcontroller 1050, a control system 1070, and a control valve 1080. The meter device 1010 further includes a fluid piping 1005, a first pitot tube 1020, a first tubing 1021, a second pitot tube 1025, a second tubing 1026, and a pressure sensor 1030.

In the system for measuring pressure differential 1000, the pipeline 1008 is connected to the fluid piping 1005 of the meter device 1010. The first pitot tube 1020 passes from the center of fluid piping 1005 through the external wall of the fluid piping 1005 and is connected to the first tubing 1021. The first tubing 1021 is connected to the pressure sensor 1030 (as described in FIG. 3) on the external wall of the fluid piping 1005. The second pitot tube 1025 passes from the center of fluid piping 1005 through the external wall of the fluid piping 1005 and is connected to the second tubing 1026. The second tubing 1026 is connected to the pressure sensor 1030 (as described in FIG. 3) on the external wall of the fluid piping 1005. The pressure sensor 1030 of the meter device 1010 is in unidirectional communication with the low pass filter 1035 and the low pass filter 1035 is in unidirectional communication with the microcontroller 1050. The microcontroller 1050 is in bidirectional communication with the control system 1070. The microcontroller 1050 is in unidirectional communication with the control valve 1080.

In operation, fluid passes through pipeline 1008 in the direction of the fluid flow indicator 1040. As fluid in the pipeline 1008 passes through the fluid piping 1005 of the meter device 1010, it flows across the section of the first pitot tube 1020 located inside fluid piping 1005 (as described in FIG. 2A, FIG. 2B, and FIG. 2C) and creates a positive pressure that is transferred from the first pitot tube 1020 through the first tubing 1021 to the pressure sensor 1030. As fluid continues to flow through the fluid piping 1005 of the meter device 1010, it next flows across the section of the second pitot tube 1025 located inside fluid piping 1005 (as described in FIG. 2A and FIG. 2B) and creates a negative pressure that is transferred from the second pitot tube 1025 through the second tubing 1026 to the pressure sensor 1030 of the meter device 1010. The difference in positive pressure created as water flows past the first pitot tube 1020 and the negative pressure created as water flows past the second pitot tube 1025 are combined at pressure sensor 1030 to create a pressure differential. The pressure differential created at pressure sensor 1030 creates a voltage in pressure sensor 1030 which is transmitted to the low pass filter 1035 and then to the microcontroller 1050 in the system for measuring pressure differential 1000.

The microcontroller 1050 is programmed by using control system 1070 to measure voltage transmitted over time (as described in FIG. 6) from pressure sensor 1030 to microcontroller 1050 to a second order polynomial where pressure differential (voltage) goes as flow rate squared (as described in FIG. 7). The voltage in pressure sensor 1030 of the meter device 1010 changes as fluid flow rate changes in the pipeline 1008 and the fluid piping 1005 of meter device 1010 as a result of the changes in pressure differential created by the positive pressure from the first pitot tube 1020 and negative pressure from the second pitot tube 1025 (as described in FIG. 8). The change in voltage as related to the change in pressure differential allows a user to measure the changes in fluid flow rate (as described in FIG. 8) and to calculate total fluid flow through the pipeline 1008 of a system for measuring pressure differential 1000 over time.

In operation, the preferred embodiment of a system to measure pressure differential 1000, the control system 1070 may be used to program the microcontroller 1050 to open or close control valve 1080 based on how much fluid flows through the meter device 1010. For example, if the microcontroller 1050 records flow rate over time and stores total volume flowing through the meter device 1010 over time, once a desired volume has been reached for a specified time period, the microcontroller 1050 may be programmed to send a signal to the control valve 1080 to stop the pipeline 1008 from carrying more fluid to a downstream user.

In an alternative embodiment, the control system 1070 may be in bidirectional communication with a plurality of microcontrollers 1050. For example, the pipeline 1008 may be one of many pipelines that deliver fluid to individual households from a storage tank. In this example, a meter device 1010 may be used for an individual household, whereby the microcontroller 1050 may be programmed to allow a predetermined volume of fluid to flow from a storage tank through the pipeline 1008. Once a predetermined volume has flowed through the meter device 1010, the microcontroller 1050 may send a signal to the control valve 1080 to close the pipeline 1008. After a predetermined time elapses, the microcontroller 1080 may be programmed to send a signal to the control valve 1080 to open the pipeline 1008 and allow fluid to flow to an individual household.

In another embodiment, the control system 1070 may be used to program the microcontroller 1050 to allow a predetermined fluid flow rate to pass through the pipeline 1008. For example, the microcontroller 1050 may send a signal to the control valve 1080 so that it may open or close to reach a predetermined fluid flow rate in the pipeline 1008. Alternatively, after a predetermined time elapses, the microcontroller 1050 may be programmed to send a signal to the control valve 1080 to open the pipeline 1008 and allow fluid to flow irrespective of the predetermined fluid flow rate. In another embodiment, the microcontroller 1050 may be programmed to send a signal to the control valve 1080 to fully close off fluid flow through the pipeline 1008 once a flow rate in the pipeline 1080 had persisted for a predetermined time.

In another embodiment, the control valve 1080 may be used to recalibrate the system for measuring pressure differential 1000. For example, the microcontroller 1050 may be programmed to close the control valve 1080 at a certain time interval, stopping flow of fluid through the pipeline 1008, resulting in a static voltage reading sensed by the pressure sensor 1030 and sent to the microcontroller 1050. The microcontroller 1050 may then reset or recalibrate to the static voltage reading sensed by the pressure sensor 1030. The microcontroller 1050 may then send a signal to reopen the control valve 1080 to allow fluid to flow through the meter device 1010 and pipeline 1008.

In another embodiment, the control system 1070 may be used to program the microcontroller 1050 to perform a full flow range calibration procedure. For example, the microcontroller 1050 may be programmed to send a signal to close the control valve 1080 at a predetermined time, stopping the fluid flow through the pipeline 1008. A static voltage may be sensed by the pressure sensor 1030 and transmitted to the microcontroller 1050, and the microcontroller 1050 may be programmed to send a signal to the control valve 1080 to open the control valve 1080 in small increments, allowing changes in fluid flow rate through the pipeline 1008 to increase over time, for example, until the maximal fluid flow rate in the pipeline 1008 is achieved. Alternatively, the maximal fluid flow rate in the pipeline 1008 may not be achieved during calibration and the microcontroller 1050 may be programmed using the control system 1070 to complete calibration using a predetermined acceptable error rate. The full flow range calibration may occur in regular or irregular intervals or alternatively may occur once a predetermined flow volume is recorded by the microcontroller 1050 and transmitted to the control system 1070. The control system 1070 may be used to monitor calibration and adjust the calibration process as needed in a particular pipeline 1008.

Figure 11:
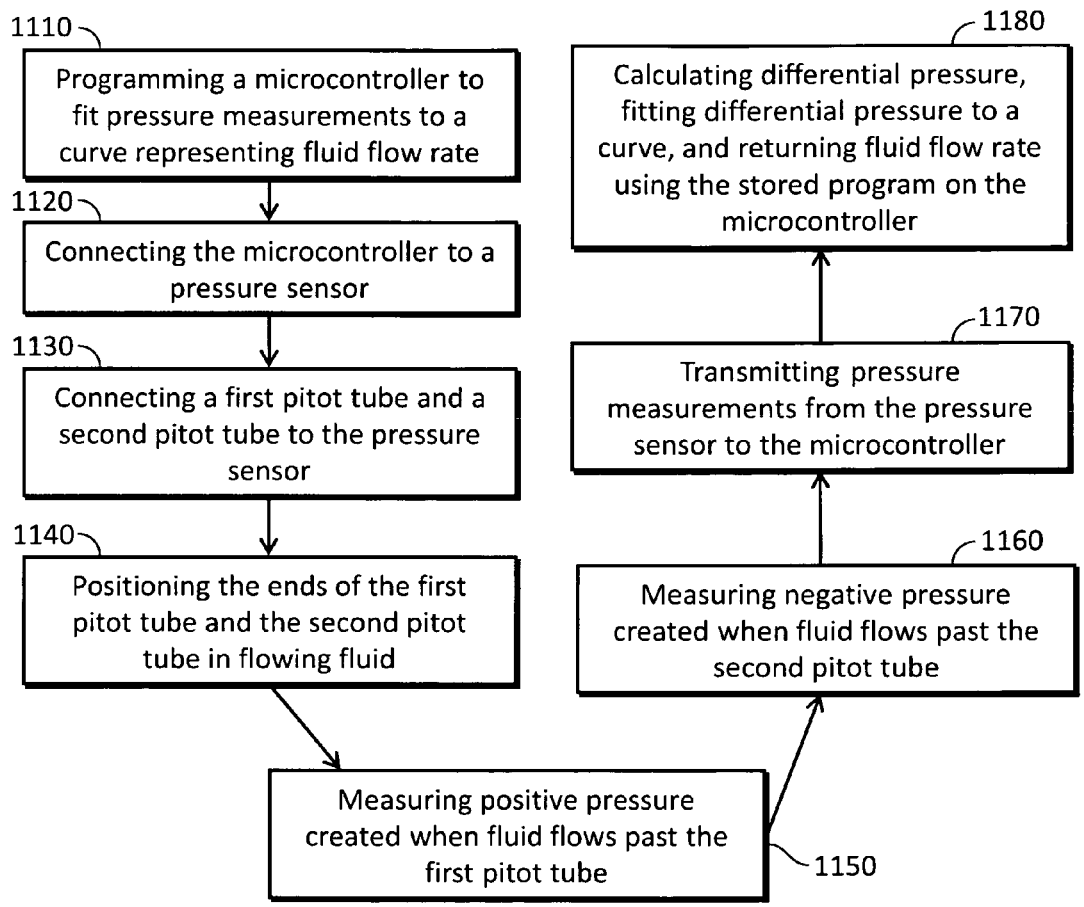
FIG. 11 is a flow chart of an embodiment of the invention for a method for measuring pressure differential created by a flowing fluid.

FIG. 11 illustrates a flow chart of an embodiment of the invention for a method for measuring pressure differential created by a flowing fluid using the meter device 110 in the system for measuring pressure differential 100 of FIG. 1. First, in step 1110, the microcontroller 150 is programmed using the control system 170 to fit pressure measurements to a curve representing fluid flow rate.

Next, in step 1120, the microcontroller 170 is connected to the pressure sensor 130.

Next, in step 1130, the first pitot tube 120 and the second pitot tube 125 are connected to the pressure sensor 130 on the external wall of the fluid piping 105.

Next, in step 1140, ends of first pitot tube 120 and the second pitot tube 125 are passed through the wall of the fluid piping 105 and positioned in fluid flowing inside the fluid piping 105.

Next, in step 1150, positive pressure is created when fluid flows over the first pitot tube 120 and is sensed by the pressure sensor 130.

Next in step 1160, negative pressure is created when fluid flows over the second pitot tube 125 and is sensed by the pressure sensor 130.

Next, in step 1170, the positive pressure and negative pressure sensed by the pressure sensor 130 are transmitted to the microcontroller 150.

Next, in step 1180, the microcontroller 170 uses the stored formula coefficients programmed in step 1110 to convert the pressure data to a fluid flow rate.

Figure 12:
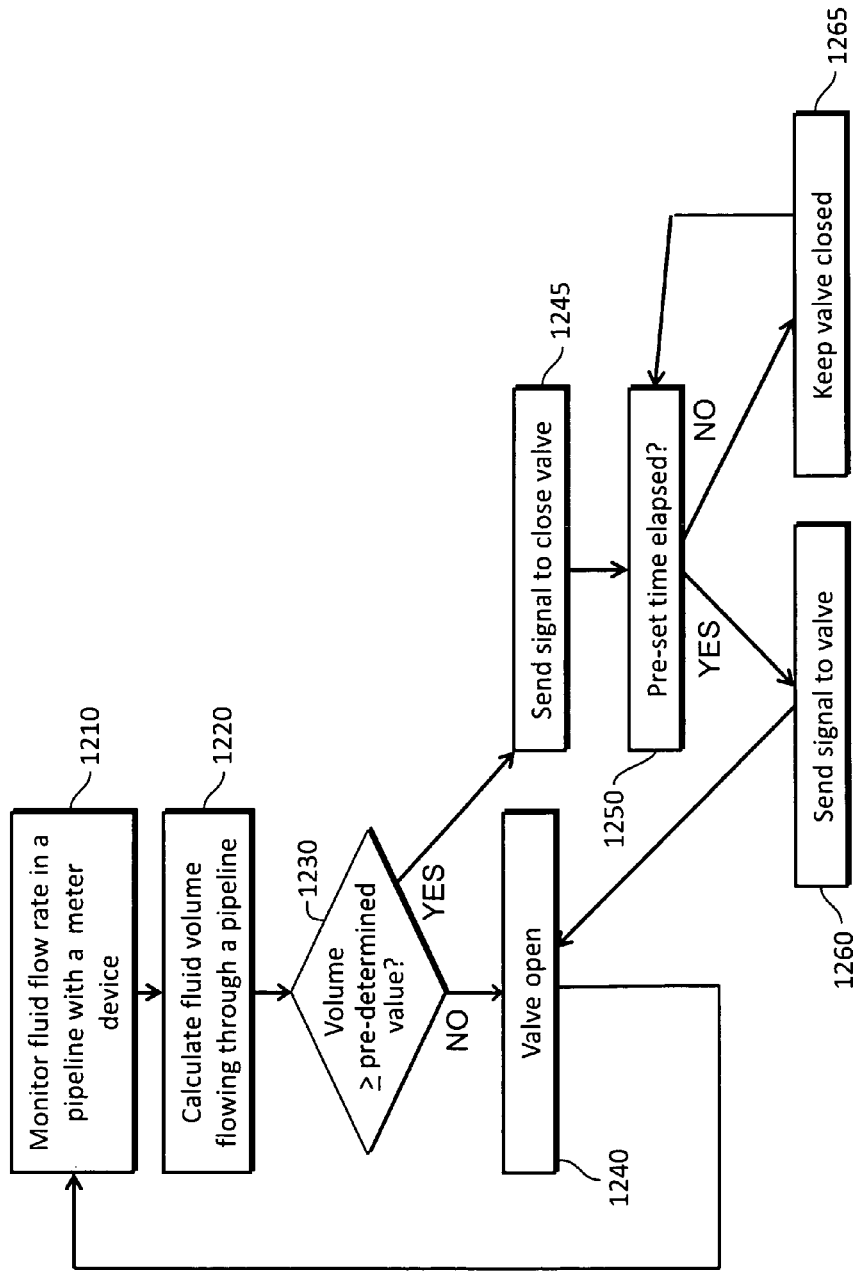
FIG. 12 is a flow chart of an alternative embodiment of the invention for a method to control fluid flow through a meter device and pipeline.

FIG. 12 illustrates a flow chart of an alternative embodiment of the invention for a method to control fluid flow through a meter device 1010 and pipeline. First, in step 1210, fluid flow rate is monitored in a pipeline with the meter device 110 of FIG. 1.

Next, in step 1220, the microcontroller 1050 of FIG. 10 is programmed to calculate fluid volume flowing through the pipeline.

Next, in step 1230, the fluid volume is compared with a predetermined volume stored on the microcontroller 1050. If the volume that has flowed through the pipeline is less than the predetermined volume stored on the microcontroller 1050, the control valve 1080 remains open and the method repeats at step 1210. If the fluid flow volume is greater than or equal to the predetermined volume stored on the microcontroller 1050, the microcontroller sends a signal to close the control valve 1080 in step 1245.

Next, in step 1250, the microcontroller monitors time that has passed since closing control valve 1080. If the preset time has elapsed, a signal is sent from the microcontroller 1050 to the control valve 1080 in step 1260 and the valve is open as in step 1240 and the method repeats at step 1210. If the preset time has not elapsed, the valve remains closed in step 1265 and step 1250 repeats until the preset time has been reached.

In the preferred embodiment, the predetermined volume of fluid in step 1230 may be determined based on the use of a community of users that share the same fluid source or pipeline in individual households. In an alternative embodiment, the predetermined volume in step 1230 may be based on different sources of fluid use within a household, for example, these sources may be a sink or bathtub.

In the preferred embodiment, the preset time in step 1250 may be based on the length of one day and may be programmed for individual households. In an alternative embodiment, the preset time in step 1250 may be based on shorter increments, for example, hours since last use.

Figure 13:
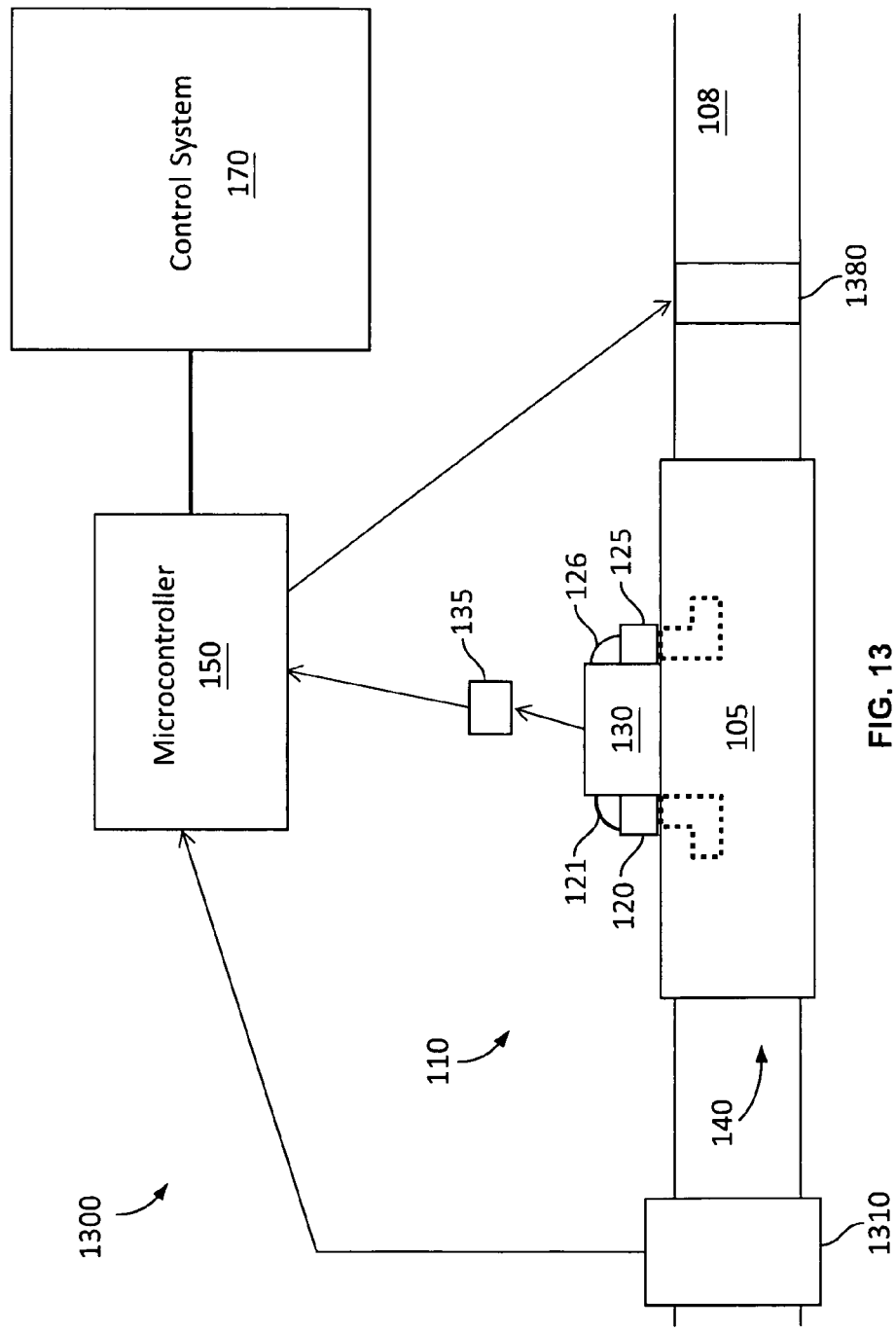
FIG. 13 illustrates a block diagram of a calibration system used to adjust data measurements taken by an individual meter device of FIG. 1 before use in an existing pipeline.

FIG. 13 illustrates a block diagram of a calibration system 1300 used to adjust data measurements taken by the meter device 110 of FIG. 1 (or the meter device 1010 of FIG. 10) before use in an existing pipeline. The calibration system 1300 for includes the meter system 110, the existing pipeline 108, the low pass filter 135, the fluid flow direction indicator 140, the microcontroller 150, and the control system 170 of FIG. 1. As described above in FIG. 1, the meter device 110 further includes the fluid piping 105, the first pitot tube 120, the first tubing 121, the second pitot tube 125, the second tubing 126, and the pressure sensor 130. The calibration system 1300 further includes a standard meter 1310 and a flow valve 1380.

In the calibration system 1300, the first pitot tube 1020 passes from the center of fluid piping 105 through the external wall of the fluid piping 105 and is connected to the first tubing 121. The first tubing 121 is connected to the pressure sensor 130 (as described in FIG. 1 and FIG. 3) on the external wall of the fluid piping 105. The second pitot tube 125 passes from the center of fluid piping 105 through the external wall of the fluid piping 105 and is connected to the second tubing 126. The second tubing 126 is connected to the pressure sensor 130 (as described in FIG. 1 and FIG. 3) on the external wall of the fluid piping 105. The pressure sensor 130 of the meter device 110 is in unidirectional communication with the low pass filter 135 and the low pass filter 135 is in unidirectional communication with the microcontroller 150. The microcontroller 150 is in bidirectional communication with the control system 170. The microcontroller 150 is in unidirectional communication with the control valve 180. The standard meter 1310 is connected to the existing the pipeline 108 and the standard meter is in unidirectional communication with the microcontroller 150. The flow valve 1380 is positioned in the existing pipeline 108 and the flow valve 1380 is in unidirectional communication with the microcontroller 150.

In operation of the calibration system 1300, fluid flows through pipeline 108 in the direction of the fluid flow indicator 140. At the time calibration is initiated, the flow valve 1380 is in a position that closes the pipeline 108 to stop fluid flow rate through the pipeline 108. The microcontroller 150 is programmed by the control system 170 to open the flow valve 1380 at a controlled rate to gradually increase fluid flow rate through the pipeline 108 until a maximal flow rate is reached.

During operation of the calibration system 1300, as fluid in the pipeline 108 passes through the standard meter 1310, the standard meter detects fluid flow rate and transmits fluid flow rate to the microprocessor 1310.

The fluid in the pipeline next flows through the fluid piping 105 of the meter device 110, where it flows across the section of the first pitot tube 120 located inside fluid piping 105 (as described in FIG. 2A, FIG. 2B, and FIG. 2C) and creates a positive pressure that is transferred from the first pitot tube 120 through the first tubing 121 to the pressure sensor 130. As fluid continues to flow through the fluid piping 105 of the meter device 110, it next flows across the section of the second pitot tube 125 located inside fluid piping 105 (as described in FIG. 2A and FIG. 2B) and creates a negative pressure that is transferred from the second pitot tube 125 through the second tubing 126 to the pressure sensor 130 of the meter device 110. The difference in positive pressure created as water flows past the first pitot tube 120 and the negative pressure created as water flows past the second pitot tube 125 are combined at pressure sensor 130 to create a pressure differential. The pressure differential created at pressure sensor 130 creates a voltage in pressure sensor 130 which is transmitted to the low pass filter 135 and then to the microcontroller 150 in the calibration system 1300.

During operation of the calibration system 1300, the microcontroller 150 simultaneously monitors the output from the standard meter 1310 and the output voltage from the pressure sensor 130 of the meter device 110 to produce the data shown in FIG. 7 and FIG. 9, voltage versus fluid flow rate. As described above in FIG. 7, these data fit well with a second order polynomial, thus eliminating the need to store large amounts of raw data on the microcontroller 150 or the control system 170. Once calibration data are collected for an individual meter device 110, the microcontroller 150 is programmed using the control system 170 to store at least three fitting coefficients for calculation of fluid flow rate through a pipeline 108. The standard meter 1310 and the flow valve 1380 may be removed from the existing pipeline 108 and the meter device 110 may be used to measure the pressure differential created by flowing fluids to calculate the fluid flow rate through a pipeline.

In another embodiment, the microcontroller 150 may be programmed to calculate the total volume of fluid flow through a pipeline 108 by multiplying fluid flow rate by a time increment between each fluid flow rate measurement and adding each of these incremental fluid flow rate measurements together to return a total volume which may be stored on the microcontroller 150 or transmitted to the control system 170.

In the preferred embodiment, the standard meter 1310 may be a displacement meter and may have pulsed output, for example of one pulse per gallon of fluid flow. In other embodiments, the standard meter 1310 may be a velocity meter, such as a turbine meter or compound meter, or may be an electromagnetic meter, or ultrasonic meter, or any other meter that may be used to accurately transmit fluid flow rate to the microcontroller 150. The standard meter 1310 may be located either upstream or downstream of the meter device 110 relative to the direction of fluid flow 140 through the existing pipeline 108.

In the preferred embodiment, the flow valve 1380 may be a faucet valve that may be located in the existing pipeline. In alternative embodiments, the flow valve 1380 may be installed inside the existing pipeline or in any other configuration that effectively allows fluid flow through the existing pipeline 108 to be controlled. The flow valve 1380 may be located either upstream or downstream of the meter device 110 relative to the direction of fluid flow 140 through the existing pipeline 108.

In view of the forgoing teaching, embodiments of the present invention provide numerous advantages over other known systems, methods, and devices for allowing a user to measure flow rate and flow volume of fluids. Importantly, the pressure differential measurement system 100 and the meter device 110 allow a user to accurately measure fluid flow rate and volume from existing pipelines in real time without the need for restricting fluid flow, without the need for extensive calibration, and without maintaining mechanical moving parts. Furthermore, the meter device 110 is easily and inexpensively adaptable and tunable for various uses, for example, adjusting the sensitivity of the meter device 110, or controlling fluid flow in a pipeline, or for use in very low fluid flow rates where the sensitivity of mechanical metering devices is inadequate for accurate fluid flow rate measurements.

First, unlike the systems of Wang and Wiklund ('731), the instant invention does not require that the fluid flow be restricted to measure fluid flow rate through a pipeline. Unlike the systems of Wiklund ('950) that require an averaging pitot tube be placed across the entire flow space of a pipe or tubing, necessarily restricting flow in the pipeline, the instant meter device 110 requires that a single opening on each of two pitot tubes be used, minimally restricting fluid flow through the pipeline. Restricting fluid flow requires that extra fluid restriction members be placed in the pipeline, which requires extra calibration to account for the static pressure around the flow restriction member placed in the pipeline. Also, flow restriction necessarily causes unwanted loss of fluid pressure. The instant invention relies on a moderate restriction of fluid flow based on the size of the pitot tubes used in the meter device 110. Because of this, the instant device is accurate and easily calibrated without the need for placing extra components in the pipeline. Furthermore, unlike the systems of Wiklund et. al. ('950) which utilize averaging pitot tubes with different shapes and sizes and must be calibrated to the particular fluid or pipeline used, the instant meter device 110 is easily adapted to different sizes of pipelines and fluid flow with minimal calibration needed before first use.

Next, unlike the system of Wiklund ('731), where the pressure sensor is embedded in a flow restriction member, the instant invention allows the pressure sensor 130 to be placed on the exterior wall of the meter device 110. If the embedded pressure sensor in Wiklund malfunctions or different pressure sensitivity is needed, the entire system must be taken apart and the flow restriction member must be removed and replaced and recalibrated. In the instant system, however, if the pressure sensor malfunctions or a higher or lower flow rate is desired in a pipeline, the pressure sensor is easily disconnected and replaced from the outside of the meter device.

Next, the systems of Wang and Wiklund ('950) further require that a separate temperature measurement be taken to allow a user to obtain accurate fluid flow information. By using a temperature compensated pressure sensor in the meter device 110 of the instant system, no further sensor placement or calibration is needed.

Finally, unlike the device of Amir, which requires mechanical moving parts be employed to allows the measurement of pressure differential or to record pressure measurements, the instant meter device 110 operates using no moving parts. Furthermore, unlike the device of Amir which requires measurements to be recorded on paper or to be visualized and recorded by a user, the instant meter device 110 transmits pressure differential measurements to a microcontroller which may be programmed to calculate, store, save, or display fluid flow rate in real time.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A method for measuring fluid flow rate, said method including:
    placing a first pitot tube in flowing fluid;
    placing a second pitot tube in flowing fluid, wherein said second pitot tube is placed in a separate location relative to said first pitot tube;
    establishing a positive pressure in said first pitot tube with said flowing fluid;
    establishing negative pressure in said second pitot with said flowing fluid;
    combining said positive pressure and said negative pressure into a pressure differential;
    connecting said pressure differential to a differential pressure sensor;
    measuring a voltage from said differential pressure sensor; and
    programming a microcontroller to store fit coefficients, wherein said fit coefficients are estimated by fitting said voltage to a polynomial.

2. The method of claim 1, further including calculating fluid flow rate in a pipeline, wherein said voltage is transmitted to said microcontroller, wherein said microcontroller uses said fit coefficients to convert said voltage to fluid flow rate.

* * * * *